United States Patent
Zimmerman (10) Patent No.: US 11,198,988 B1
(45) Date of Patent: Dec. 14, 2021

(54) SPEED-LIMITING CALIBRATION CONTROL FOR A HYDRAULIC SYSTEM

(71) Applicant: CNH Industrial America LLC, New Holland, PA (US)

(72) Inventor: Joshua Zimmerman, Willow Springs, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/133,044

(22) Filed: Dec. 23, 2020

(51) Int. Cl.
  *E02F 9/22* (2006.01)
  *F15B 11/17* (2006.01)

(52) U.S. Cl.
  CPC .......... *E02F 9/2253* (2013.01); *E02F 9/2292* (2013.01); *F15B 11/17* (2013.01)

(58) Field of Classification Search
  CPC ....... F16H 2061/166; F16H 2059/6876; F16H 61/423; E02F 9/2253; E02F 9/2292; F15B 11/17
  See application file for complete search history.

(56) References Cited

U.S. PATENT DOCUMENTS

| | | | |
|---|---|---|---|
| 8,321,114 B2 | 11/2012 | Kamado et al. | |
| 9,458,597 B2 | 10/2016 | Ikegami et al. | |
| 10,815,752 B2 | 10/2020 | Urdaneta | |
| 2005/0161090 A1* | 7/2005 | Haramoto | F16H 61/4148 137/493 |

FOREIGN PATENT DOCUMENTS

| | | |
|---|---|---|
| DE | 102016200259 | 7/2017 |
| JP | 2014177969 | 9/2019 |
| WO | 2019206456 | 10/2019 |
| WO | 2020066225 | 4/2020 |

\* cited by examiner

*Primary Examiner* — Abiy Teka
(74) *Attorney, Agent, or Firm* — Peter Zacharias; Patrick Sheldrake (57) ABSTRACT

A hydraulic system for a work vehicle includes a hydraulic motor configured to generate rotational power for one or more wheels on the work vehicle. The hydraulic system also includes a hydraulic pump coupled to the hydraulic motor, wherein the hydraulic pump is configured to pump hydraulic fluid to the hydraulic motor. The hydraulic system further includes a hydraulic control system with a processor that is configured to receive one or more inputs indicative of a speed of the hydraulic motor and to trigger a calibration protocol in response to determining that the one or more inputs indicate occurrence of an overspeed condition or an underspeed condition. The processor is also configured to set a maximum pump command for the hydraulic pump, a minimum motor volume command for the hydraulic motor, or both based on a calibration factor generated by the calibration protocol.

21 Claims, 4 Drawing Sheets

SPEED-LIMITING CALIBRATION CONTROL FOR A HYDRAULIC SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A hydraulic system may include a hydraulic pump that pressurizes a hydraulic fluid to generate a pressurized hydraulic fluid, which may then be used to perform various tasks. A work vehicle (e.g., an agricultural vehicle and/or a construction vehicle, such as a skid steer) may include the hydraulic system. In such cases, the pressurized hydraulic fluid may be used to actuate a hydraulic motor that generates rotational power to drive one or more wheels of the work vehicle.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a hydraulic system for a work vehicle includes a hydraulic motor configured to generate rotational power for one or more wheels on the work vehicle. The hydraulic system also includes a hydraulic pump coupled to the hydraulic motor, wherein the hydraulic pump is configured to pump hydraulic fluid to the hydraulic motor. The hydraulic system further includes a hydraulic control system with a processor that is configured to receive one or more inputs indicative of a speed of the hydraulic motor and to trigger a calibration protocol in response to determining that the one or more inputs indicate occurrence of an overspeed condition or an underspeed condition. The calibration protocol includes comparing the speed of the hydraulic motor to a maximum speed for the hydraulic motor to generate a calibration factor. The processor is also configured to set a maximum pump command for the hydraulic pump, a minimum motor volume command for the hydraulic motor, or both based on the calibration factor.

In one embodiment, a hydraulic control system for a work vehicle includes a processor that is configured to receive a first input indicative of a speed of a hydraulic motor, a second input indicative of a motor parameter for the hydraulic motor, and a third input indicative of a pump parameter for a hydraulic pump that is configured to pump a hydraulic fluid to the hydraulic motor. The processor is also configured to trigger a calibration protocol in response to determining occurrence of an overspeed condition in which the speed exceeds a maximum speed of the hydraulic motor or an underspeed condition in which the speed is below the maximum speed of the hydraulic motor. The processor is also configured to determine a calibration factor based on a ratio between the speed and the maximum speed of the hydraulic motor as part of the calibration protocol. The processor is further configured to set a maximum pump parameter for the hydraulic pump based on the pump parameter for the hydraulic pump and the calibration factor, a minimum motor volume parameter for the hydraulic motor based on the motor parameter and the calibration factor, or both.

In one embodiment, a method of operating a hydraulic system for a work vehicle includes providing, using one or more processors, a pump command to a hydraulic pump to cause the hydraulic pump to pump hydraulic fluid to a hydraulic motor. The method also includes receiving, at the one or more processors, one or more inputs indicative of a speed of the hydraulic motor. The method also includes triggering, using the one or more processors, a calibration protocol in response to determining that the one or more inputs indicate occurrence of an overspeed condition or an underspeed condition. The method also includes generating, using the one or more processors, a calibration factor based on the speed of the hydraulic motor and a maximum speed for the hydraulic motor. The method also includes setting, using the one or more processors, a maximum pump command for a hydraulic pump, a minimum motor volume command for the hydraulic motor, or a command ratio between the maximum pump command and the minimum motor volume command based on the calibration factor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B. Numerical terms, such as "first," "second," "third," and "fourth," are used to distinguish elements to facilitate discussion, and it should be noted that the numerical terms may be used differently or assigned to different elements in the claims.

Work vehicles (e.g., agricultural vehicles; construction vehicles, such as a skid steer) may include one or more hydraulic systems that provide power to complete various tasks. These various tasks may include loading, lifting, pushing, rotating, dozing, and/or moving the work vehicle. For example, a work vehicle may include a hydraulic system (e.g., hydraulic transmission system) that includes one or more hydraulic pumps that provide a hydraulic fluid to one or more hydraulic motors that drive wheels of the work vehicle. The wheels in turn couple to tracks, which enable the work vehicle to traverse various types of terrain.

To drive the work vehicle, an operator may provide a drive command via one or more input devices (e.g., a joystick in a cab of the work vehicle). The drive command may adjust components of the hydraulic system, such as to adjust a flow rate of the hydraulic fluid from the one or more hydraulic pumps to the one or more hydraulic motors (e.g., with a fixed displacement motor) and/or to adjust a volume of the one or more hydraulic motors (e.g., with variable motors), for example. In this way, a speed (e.g., motor speed) of the one or more hydraulic motors and a ground speed of the work vehicle may vary based on a position of the one or more input devices.

The work vehicle may provide a single speed range (e.g., single gear; fixed displacement hydraulic motor), or the work vehicle may provide multiple speed ranges (e.g., multiple gears; two-speed, three-speed, or more; variable hydraulic motor). In some embodiments, to change the speed range for the work vehicle (e.g., between a first speed range, such as a lower speed range, and a second speed range, such as a higher speed range), the operator may provide a shifting command via the one or more input devices (e.g., a switch). Then, the shifting command may cause the hydraulic system to increase or to decrease a motor volume of the one or more hydraulic motors to provide the change in the speed range (e.g., a higher volume for a first, lower speed range; a lower volume for the second, higher speed range) that is achievable via the hydraulic fluid provided by the one or more hydraulic pumps.

The one or more hydraulic motors may be capable of reaching an undesirable motor speed that exceeds a maximum motor speed (e.g., rated or recommended maximum motor speed for the hydraulic motor; set by manufacturer), and the one or more hydraulic pumps may be capable of providing the hydraulic fluid at flow rates that drive the one or more hydraulic motors at the undesirable motor speed. In this way, the one or more hydraulic motors may reach an overspeed condition (e.g., when a motor speed exceeds the maximum motor speed). Furthermore, the one or more hydraulic motors and/or the one or more hydraulic pumps may experience leakage or other changes over time. For example, leakage at the one or more hydraulic pumps may result in the one or more hydraulic pumps providing the hydraulic fluid at a lower flow rate for a particular pump command. Thus, the one or more hydraulic motors may operate at an underspeed condition (e.g., when the motor speed is less than the maximum motor speed when the maximum motor speed is commanded). Accordingly, it would be desirable to implement a speed-limiting calibration control (e.g., a calibration protocol) for the hydraulic system using a controller (e.g., a calibration controller) to thereby efficiently manage the flow rate of the hydraulic fluid from the one or more hydraulic pumps to avoid the overspeed condition, the underspeed condition, or both.

In operation, the controller may receive various inputs (e.g., input device position, speed range, pump command input, motor speed, load, and/or engine speed) that indicate an occurrence of the overspeed condition or the underspeed condition for the hydraulic system. As an example, in response to identification of the overspeed condition, the controller may trigger the calibration protocol, which may compare the motor speed to the maximum motor speed to generate a calibration factor (e.g., ratio of the motor speed to the maximum motor speed). The controller may then use the calibration factor to adjust or set a maximum pump command (e.g., maximum allowable pump command) for the one or more hydraulic pumps (e.g., decrease the maximum pump command by the calibration factor; if the motor speed is 20 percent greater than the maximum motor speed, the controller may decrease the maximum pump command by 20 percent). In this way, the controller may set the maximum pump command to limit the flow rate of the hydraulic fluid, which limits the motor speed of the one or more hydraulic motors to not exceed the maximum motor speed for the one or more hydraulic motors.

The embodiments discussed in detail herein generally include the controller that sets the maximum pump command as part of the calibration protocol to facilitate discussion. However, it should be appreciated that the calibration protocol may be adapted for use with a continuously variable pump, a continuously variable motor, or both, and thus, the controller may set other commands as part of the calibration protocol to achieve speed-limiting calibration. For example, with the continuously variable motor, the calibration protocol may set a minimum motor volume command for the one or more hydraulic motors based on the calibration factor to thereby limit the motor speed and the ground speed of the work vehicle (e.g., increase the minimum motor volume command by the calibration factor; if the motor speed is 20 percent greater than the maximum motor speed, the controller may increase the minimum motor volume command by 20 percent). Furthermore, in some embodiments, the calibration protocol may set the maximum pump command and the minimum motor volume command in a coordinated manner (e.g., set a command ratio to limit the ratio between the pump command and the motor command) based on the calibration factor to thereby limit the motor speed and the ground speed of the work vehicle. Advantageously, the calibration protocol may enable the hydraulic system to drive the work vehicle at appropriate speeds (e.g., at the maximum motor speed when commanded), reduce wear on the components of the hydraulic system, and the like. It should be appreciated that the controller may be configured to carry out various additional or alterative steps as part of the calibration protocol, and at least some of the various additional or alternative steps are set forth in more detail herein.

Figure 1:
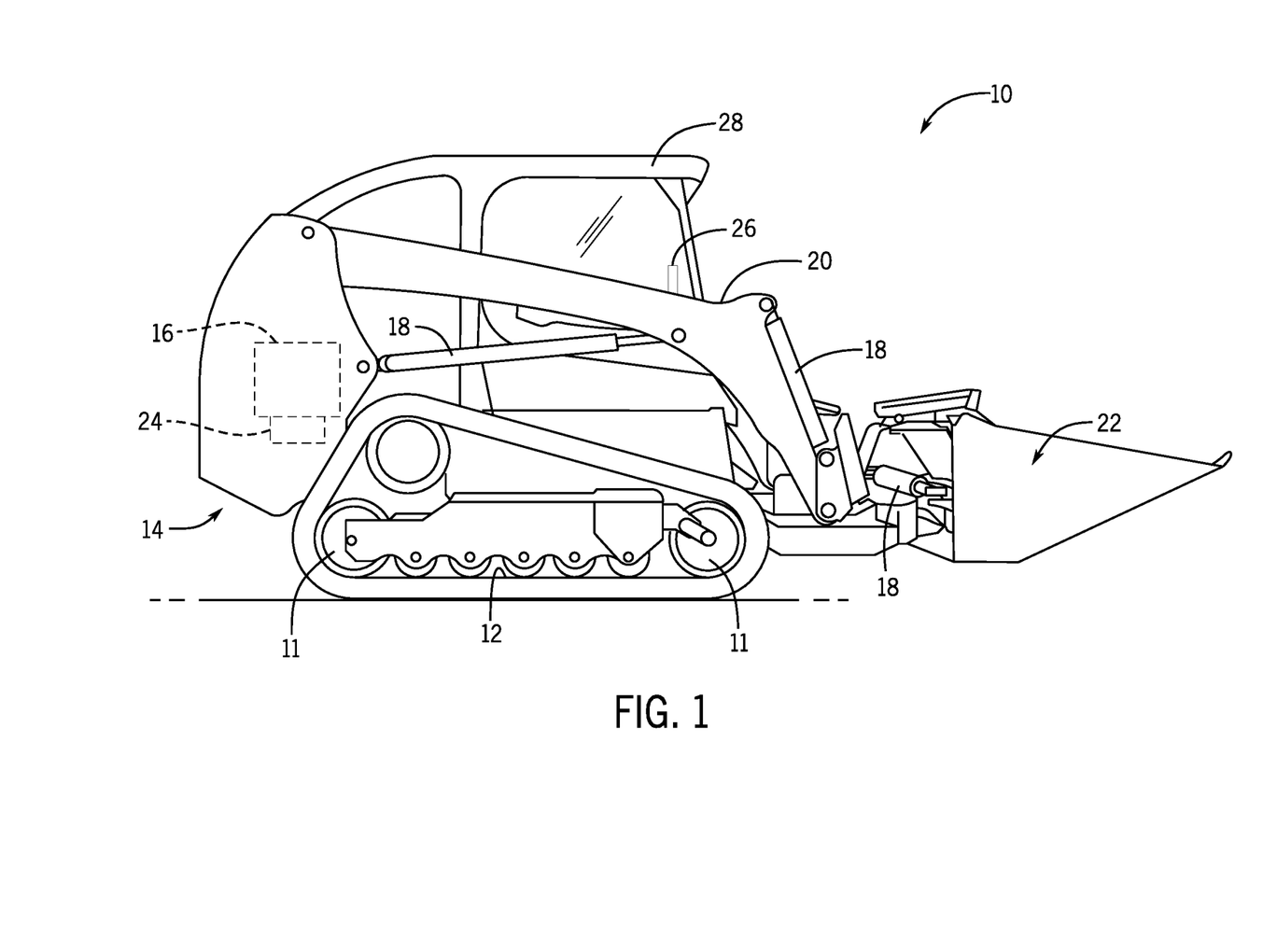
FIG. 1 is a side view of a work vehicle, in accordance with an embodiment of the present disclosure.

FIG. 1 is a side view of an embodiment of a work vehicle 10 (e.g., a skid steer). The work vehicle 10 may include wheels 11 and tracks 12 that enable the work vehicle 10 to move. The work vehicle 10 includes an engine 14 that provides power to a hydraulic system 16 (e.g., hydraulic transmission system). The hydraulic system 16 in turn provides power to the wheels 11, which then rotate the tracks 12. The hydraulic system 16 may also provide power to other systems on the work vehicle 10. For example, the hydraulic system 16 may provide power to hydraulic actuators 18 (e.g., hydraulic cylinders) that control operation of one or more arms 20 (e.g., booms). The arms 20 couple to a tool 22 that enables the work vehicle 10 to perform various tasks. For example, the tool 22 may be a fork, bucket, plow, blade, among others. In the illustrated embodiment, the tool 22 is a bucket that enables the work vehicle 10 to perform loading tasks. The tool 22 may instead be (e.g., changed to) a blade to perform dozing tasks and/or the tool 22 may instead be (e.g., changed to) another type of tool for another type of task.

As discussed in more detail below, the hydraulic system 16 may include one or more hydraulic pumps and one or more hydraulic motors that provide power to the wheels 11 on the work vehicle 10. The hydraulic system 16 may include a hydraulic control system 24 that adjusts the one or more hydraulic pumps and/or the one or more hydraulic motors to adjust the power that is output to the wheels 11 on the work vehicle 10 to drive the work vehicle 10 at various ground speeds. For example, the hydraulic control system 24 may adjust a pump command to the one or more hydraulic pumps to adjust the flow rate of the hydraulic fluid that is provided by the one or more hydraulic pumps to the one or more hydraulic motors.

The hydraulic control system 24 may adjust the pump command based on a drive command received from one or more input devices 26 (e.g., joystick) within a cab 28 of the work vehicle 10. For example, if an operator pushes the one or more input devices 26 to a maximum position (e.g., limit position) while in a highest speed range (e.g., a highest gear) for the work vehicle 10, the hydraulic control system 24 may adjust the pump command to a maximum pump command for the one or more hydraulic pumps to thereby drive the one or more hydraulic motors. In this way, an operator may control the ground speed of the work vehicle 10 by manipulating the one or more input devices 26. As discussed in more detail below, present embodiments provide a controller that is configured to carry out a calibration protocol to enable the maximum pump command for the one or more hydraulic pumps to drive the one or more hydraulic motors to operate at (e.g., at or substantially at) a maximum motor speed (e.g., a rated or recommended maximum motor speed for the hydraulic motor; set by manufacturer) and to avoid an overspeed condition (e.g., the motor speed exceeds the maximum motor speed), to avoid an underspeed condition (e.g., the motor speed is below the maximum motor speed when the maximum motor speed is commanded), or both.

As noted above, in some cases, the hydraulic control system 24 may also adjust a motor command to the one or more hydraulic motors to adjust a volume of the one or more hydraulic motors to change the speed range (e.g., shift gears). The hydraulic control system 24 may adjust the motor command based on a shift command received from the one or more input devices 25 (e.g., switch, touchscreen display) within the cab 28 of the work vehicle 10. In this way, the operator may shift gears (e.g., between a low gear and a high gear in a two-speed hydraulic system) to enable the operator to use the one or more input devices 26 (e.g., joystick) to control the ground speed of the work vehicle 10 within speed ranges associated with the gears (e.g., within a respective speed range associated with a selected gear). As discussed in more detail below, the hydraulic control system 24 may consider the speed range as an input, such as during the calibration protocol.

Figure 2:
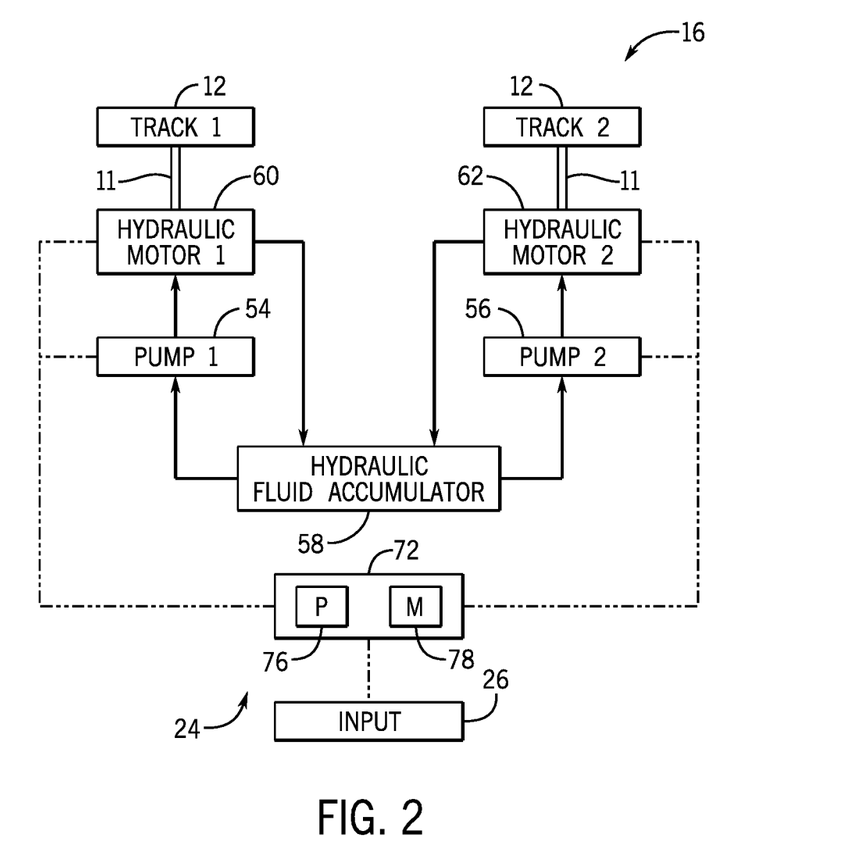
FIG. 2 is a schematic diagram of a hydraulic system that may be used in the work vehicle of FIG. 1, in accordance with an embodiment of the present disclosure.

FIG. 2 is a schematic diagram of an embodiment of the hydraulic system 16 and the hydraulic control system 24 that may be used in a work vehicle, such as in the work vehicle 10 of FIG. 1. The hydraulic system 16 may include a first hydraulic pump 54 and a second hydraulic pump 56 that receive hydraulic fluid from a hydraulic accumulator or source 58. The first hydraulic pump 54 pressurizes the hydraulic fluid and provides the pressurized hydraulic fluid to the first hydraulic motor 60. The second pump 56 pressurizes the hydraulic fluid and provides the pressurized hydraulic fluid to a second hydraulic motor 62. The hydraulic motors 60, 62 may be fixed displacement motors, may be continuously variable displacement motors, or may have discrete volumes associated with respective discrete speed shifts (e.g., two discrete volumes associated with two discrete speed shifts in a two-speed motor). As the hydraulic motors 60, 62 receive the pressurized hydraulic fluid, the hydraulic motors 60, 62 drive rotation of respective first and second wheels 11. The wheels 11 in turn may couple to and rotate first and second vehicle tracks 12 to drive the work vehicle to move. It should be understood, that the hydraulic system 16 may be modified to include a different number of pumps, hydraulic motors, wheels, and/or tracks (e.g., 1, 2, 3, 4, or more). Furthermore, in FIG. 2, the hydraulic fluid is shown as returning from the hydraulic motors 60, 62 to the hydraulic accumulator or source 58 to facilitate discussion. However, it should be appreciated that the hydraulic fluid may return directly to the hydraulic pumps 54, 56, and optionally with a small portion of the hydraulic fluid recirculating back to the hydraulic accumulator or source 58 (e.g., for cooling).

In order to provide enhanced functionality, the hydraulic control system 24 couples to the hydraulic system 16. More specifically, the hydraulic control system 24 couples to and controls operation of the first and second hydraulic pumps 54, 56 and the first and second hydraulic motors 60, 62. The hydraulic control system 24 may include a controller 72 that is configured carry out the calibration protocol. The controller 72 also receives signals (e.g., drive command, shift command) from the one or more input devices 26 and controls various components to drive the work vehicle. As an example, during a work operation, the operator may utilize the one or more input devices 26 (e.g., switch) to select a first gear. Then, the operator may utilize the one or more input devices 26 (e.g., joystick) to drive the work vehicle at speeds that are within a respective speed range associated with the first gear. In a multi-speed hydraulic system 16 (e.g., two-speed), at another time during the work operation, the operator may utilize the one or more input devices 26 (e.g., switch) to select a second gear, and then the operator may utilize the one or more input devices 26 (e.g., joystick) to drive the work vehicle at speeds that are within a respective speed range associated with the second gear.

As discussed in more detail below, the controller 72 includes a processor 76 that receives the inputs from the one or more input devices 26 and executes instructions stored on a memory 78 to control operation of the hydraulic pumps 54, 56 (e.g., via pump commands) and the hydraulic motors 60, 62 (e.g., via motor commands) to drive the work vehicle in this way. As the operator drives the work vehicle, the processor 76 may also receive various other inputs, such as sensor inputs from one or more sensors 74 that may be positioned about the hydraulic system 16 and/or other locations within the work vehicle. For example, the one or more sensors 74 may include sensors configured to monitor the motor speed of the hydraulic motors 60, 62, the pump input command (e.g., from the controller 72 to the hydraulic pumps 54, 56), a load on the engine, and/or an engine speed of the engine. The processor 76 executes instructions stored on the memory 78 to process the inputs to carry out a calibration protocol, which may include setting the maximum pump command for the hydraulic pumps 54, 56 and/or carrying out other steps (e.g., setting a minimum motor volume command; setting a command ratio) to thereby limit the motor speed of the hydraulic motors 60, 62.

The processor 76 may be a microprocessor that executes software that enables control of the hydraulic system 16. The processor 76 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 76 may include one or more reduced instruction set computer (RISC) processors. The memory 78 may include a volatile memory, such as random access memory (RAM), and/or a nonvolatile memory, such as read-only memory (ROM). The memory 78 may store a variety of information and may be used for various purposes. For example, the memory 78 may store processor executable instructions, such as firmware or software, for the processor 76 to execute. The memory 78 may include ROM, flash memory, a hard drive, or any other suitable optical, magnetic, or solid-state storage medium or a combination thereof. The memory 78 may store data, instructions, and any other suitable data.

Figure 3:
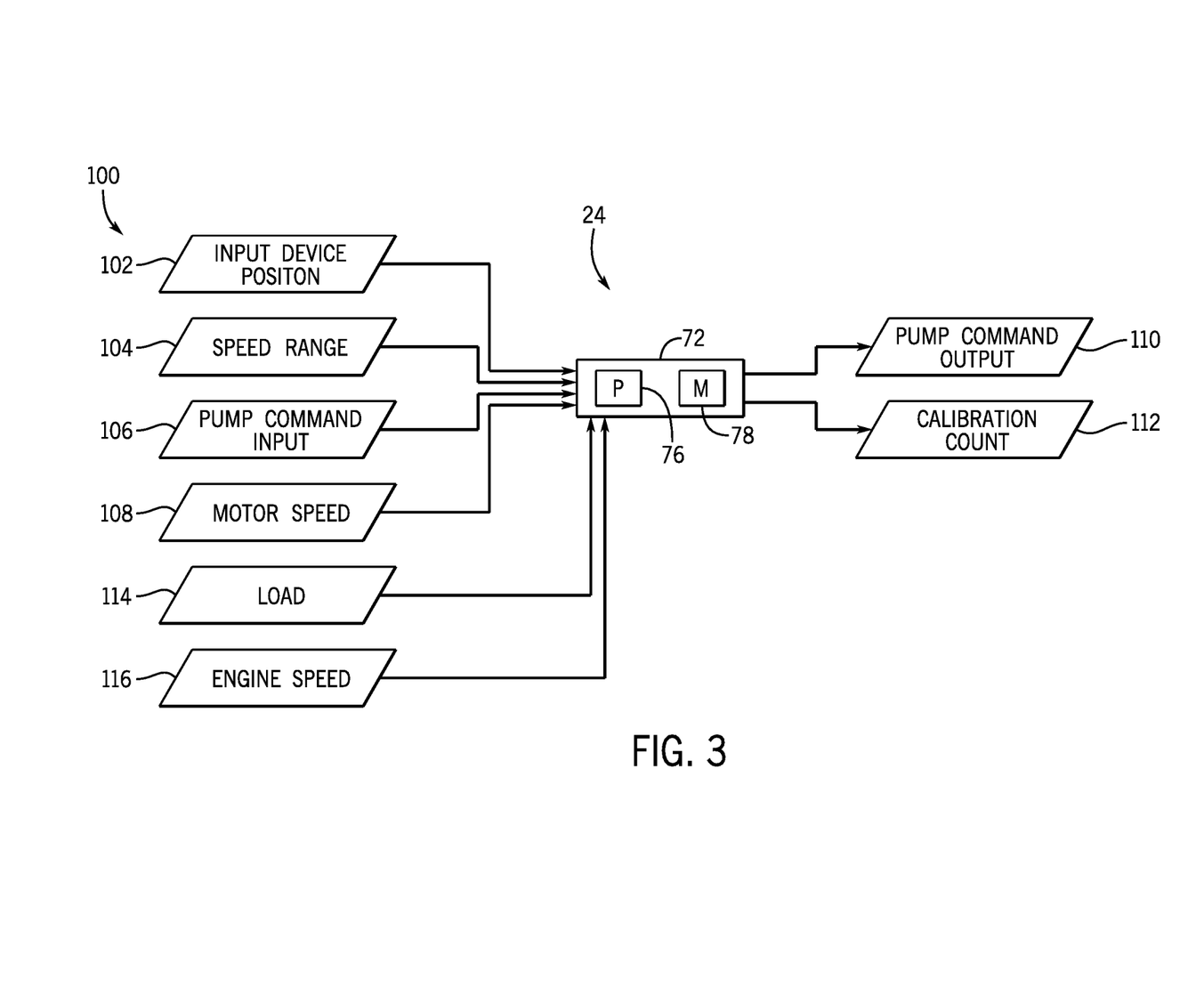
FIG. 3 is a schematic diagram of a controller of the hydraulic system of FIG. 2, wherein the controller is configured to provide speed-limiting calibration control for the hydraulic system, in accordance with an embodiment of the present disclosure.

FIG. 3 is a schematic diagram of the hydraulic control system 24, wherein the hydraulic control system 24 receives inputs 100 that indicate an overspeed condition, an underspeed condition, or both. As discussed above, the overspeed condition exists when the motor speed for the hydraulic motors exceeds the maximum motor speed. The maximum motor speed may be established for the hydraulic motors and may not change during operation of the work vehicle (e.g., the maximum motor speed is a fixed value that is stored in the memory 78; set at manufacturing). It is generally desirable that the hydraulic motors do not reach the overspeed condition during any operation, as the overspeed condition may wear the hydraulic motors and/or result in inappropriate operational characteristics for the work vehicle.

In order to determine whether the overspeed condition exists, the processor 76 of the controller 72 of the hydraulic control system 24 may receive and process various inputs 100, such as, but not limited to, an input device position 102, a speed range 104 (e.g., gear), a pump command input 106 for the hydraulic pumps, and/or a motor speed 108 of the hydraulic motors. With variable hydraulic motors, the various inputs 100 may additionally or alternatively include a motor command input for the hydraulic motors (e.g., indicative of a volume of the hydraulic motors).

The input device position 102 may be determined based on signals received from the one or more input devices (e.g., joystick) that indicate the drive command provided by the operator, and the input device position 102 may relate to a position of the one or more inputs devices (e.g., between limit positions, such as between a minimum position and a maximum position). Thus, the input device position 102 may indicate whether the operator has commanded the work vehicle to drive at a high speed or a low speed, as well as a drive direction (e.g., straight; forward or reverse) for the work vehicle. The input device position 102 may also indicate respective input device positions for each input device when multiple input devices are present, such as in the work vehicle with one input device that is used to drive a left-side track and one input device is used to drive a right-side track.

The speed range 104 may be determined based on signals received from the one or more input devices (e.g., switch, touchscreen display) that indicate the shift command provided by the operator and/or signals received from the hydraulic motors that indicate the motor volume of the hydraulic motors. The speed range 104 may relate to and define the motor speeds that are achievable in response to the drive command. For example, where the hydraulic motors are two-speed motors, the speed range 104 may be either a low speed range or a high speed range. When the operator manipulates the one or more input devices (e.g., joystick) between the limit positions while the speed range 104 is the low speed range, the motor speed may change within the low speed range. When the operator manipulates the one or more input devices (e.g., joystick) between the limit positions while the speed range 104 is the high speed range, the motor speed may change within the high speed range.

The pump command input 106 for the hydraulic pumps may be determined based on signals output by the controller 72 that indicate the pump command provided to control the hydraulic pumps and/or signals received from the sensors 74 at the hydraulic pumps. For example, the sensors 74 at the hydraulic pumps may swash plate sensors that measure a volume of the hydraulic pumps due to the pump command and/or the flow rate of the hydraulic fluid from the hydraulic pumps due to the pump command. The pump command input 106 may relate to the volume of the hydraulic pumps and/or the flow rate of the hydraulic fluid from the hydraulic pumps. The pump command input 106 may therefore be considered the pump command or another type of pump parameter that may be received at the controller 72 and utilized to carry out the calibration protocol. As mentioned above, with variable hydraulic motors, the various inputs 100 may additionally or alternatively include the motor command input or other type of motor parameter (e.g., based on swash plate sensors) for the hydraulic motors (e.g., indicative of the volume of the hydraulic motors).

The motor speed 108 of the hydraulic motors may be determined based on signals received from the sensors 74 at the hydraulic motors and/or from any other suitable type of sensor 74, such as a global positioning system or a ground speed sensor of the work vehicle that outputs signals that can be correlated to (e.g., have a known relationship to) the motor speed 108. For example, the sensors 74 at the hydraulic motors may measure a rotational speed of an output shaft that is used to drive the wheels of the work vehicle. The motor speed 108 is adjustable, such as by changing the pump command input 106 to change the volume of the hydraulic pumps and the flow rate of the hydraulic fluid from the hydraulic pumps.

During operation of the work vehicle, the controller 72 may monitor the inputs 100. In response to the motor speed 108 exceeding the maximum motor speed while the input device position 102 indicates that the work vehicle is being driven straight (e.g., forward or backward), the speed range state 104 is a highest speed range (e.g., a highest gear), the pump command input 106 is above a pump command threshold (e.g., the pump command input 106 is at or near a maximum pump command for the hydraulic pumps), the motor command input is below a motor command threshold (e.g., the motor command input is at or below a minimum motor volume command for the hydraulic motors), and/or a ratio between the motor volume and the pump volume is at a target ratio, the controller 72 may identify occurrence of the overspeed condition and may trigger (e.g., initiate) the calibration protocol for the overspeed condition. It should be appreciated that the overspeed condition may be identified in other ways, such as any time the motor speed 108 exceeds the maximum motor speed (e.g., regardless of the input device position 102, the speed range 104, and/or the pump command input 106). Furthermore, the controller 72 may trigger (e.g., initiate) the calibration protocol for the overspeed condition in response to the overspeed condition persisting for more than a threshold time period (e.g., longer than 10, 15, 30, or 60 seconds).

To carry out the calibration protocol, the controller 72 may compare the motor speed 108 to the maximum motor speed (e.g., access from the memory 78) to generate a calibration factor (e.g., ratio between the motor speed 108 and the maximum motor speed). Then, the controller 72 may use the calibration factor to generate and to provide an output, such as a pump command output 110. The pump command output 110 may be provided to the hydraulic pumps to reduce the volume of the hydraulic pumps and the flow rate of the hydraulic fluid from the hydraulic pumps. For example, if the motor speed 108 is 20 percent greater than the maximum motor speed, the controller 72 may set the pump command output 110 to be 20 percent less than the pump command input 106 and/or the previous maximum pump command (e.g., the pump command input 106 and the previous maximum pump command may be the same). In some embodiments, the pump command output 110 may be set as the maximum pump command for the hydraulic pumps and/or stored as the maximum pump command for the hydraulic pumps (e.g., in the memory 78) so as to be accessible and used for future operations of the work vehicle (e.g., even after turning the work vehicle off and on).

As noted above, it should be appreciated that the calibration protocol may be adapted for use with a continuously variable pump, a continuously variable motor, or both, and thus, the controller may set other commands as part of the calibration protocol to achieve speed-limiting calibration. For example, the calibration protocol may provide a motor volume command output to set the minimum motor volume command for the one or more hydraulic motors based on the calibration factor to thereby limit the motor speed and the ground speed of the work vehicle (e.g., increase the minimum motor volume command by the calibration factor; if the motor speed is 20 percent greater than the maximum motor speed, the controller may increase the minimum motor volume command by 20 percent). Furthermore, in some embodiments, the calibration protocol may set the maximum pump command and the minimum motor volume command in a coordinated manner (e.g., provide a command ratio as an output to limit the ratio between the pump command and the motor command) based on the calibration factor to thereby limit the motor speed and the ground speed of the work vehicle.

Furthermore, it should be appreciated that the controller 72 may set other target parameters, such as pump volume or motor volume measured by swash plate sensors, as part of the calibration protocol. Additionally, the controller 72 may output the pump command, the motor command, or both to achieve (e.g., via feedback) the other target parameters as part of the calibration protocol. Thus, it should be appreciated that the disclosure herein of setting the maximum pump command, the maximum motor command, or both is intended to broadly cover embodiments in which the controller 72 sets the maximum pump command, the maximum motor volume command, or both directly based on the calibration factor (e.g., via multiplication of the pump command or the motor command by the calibration factor) or sets the maximum pump command, the minimum motor volume command, or both indirectly based on the calibration factor that is used to set limits on other parameters, such as the pump volume, the motor volume, or both (e.g., via multiplication of the pump volume or the motor volume by the calibration factor). For example, a limit on the pump volume may be determined based on the calibration factor, then the pump command may be adjusted until the swash plate sensors indicate that the limit on the pump volume is reached. Thus, in such cases, effectively the maximum pump command may be set when the limit on the pump volume is set.

In some embodiments, the controller 72 may determine and/or output a calibration count 112 that indicates a total number of calibration protocols carried out by the controller 72 over time. For example, wherein the calibration protocol is triggered to reduce the maximum pump command to address the overspeed condition, the controller 72 may increase the calibration count 112 by one calibration protocol. The controller 72 may provide the calibration count 112 via a display within the cab of the work vehicle for visualization by the operator. In some embodiments, the controller 72 may provide an alert (e.g., visual or audible alert) in response to the calibration count 112 exceeding a count threshold (e.g., an absolute threshold; within a time period that periodically resets). For example, if the calibration count 112 exceeds three calibration protocols within one month, the controller 72 may provide a text message on the display that recommends maintenance procedures for the work vehicle.

In order to determine whether the underspeed condition exists, the processor 76 of the controller 72 of the hydraulic control system 24 may receive and process the various inputs 100. In some embodiments, the inputs 100 may include the input device position 102, the speed range 104 (e.g., gear), the pump command input 106 for the hydraulic pumps, the motor command input, the motor speed 108 of the hydraulic motors, a load on an engine 114, and/or an engine speed 116 of the engine.

The load on the engine 114 and/or the engine speed 116 may be determined based on signals received from the sensors 74 at the engine. The load on the engine 114 and/or the engine speed 116 may indicate whether the work vehicle is experiencing work conditions and/or engine conditions that may explain or result in the underspeed condition. For example, the hydraulic motors may not be able to achieve the maximum motor speed if the load on the engine 114 is high.

During operation of the work vehicle, the controller 72 may monitor the inputs 100. In response to the motor speed 108 being below the maximum motor speed (e.g., by a threshold underspeed amount; by more than 5, 10, 15, or 20 percent) while the input device position 102 indicates that the work vehicle is being driven straight (e.g., forward or backward), the speed range state 104 is the highest speed range (e.g., the highest gear), the pump command input 106 is above the pump command threshold (e.g., the pump command input 106 is at or near the maximum pump command for the hydraulic pumps), the load on the engine 114 is within below a load threshold (e.g., no load or minimal load), and/or the engine speed 116 is within an engine speed threshold (e.g., normal speed range), the controller 72 may identify occurrence of the underspeed condition and may trigger (e.g., initiate) the calibration protocol for the underspeed condition. It should be appreciated that the controller 72 may trigger (e.g., initiate) the calibration protocol for the underspeed condition in response to the underspeed condition persisting for more than a threshold time period (e.g., longer than 10, 15, 30, or 60 seconds).

To carry out the calibration protocol, the controller 72 may compare the motor speed 108 to the maximum motor speed (e.g., access from the memory 78) to generate the calibration factor (e.g., ratio between the motor speed 108 and the maximum motor speed). Then, the controller 72 may use the calibration factor to generate and to provide the pump command output 110. The pump command output 110 may be provided to the hydraulic pumps to increase the volume of the hydraulic pumps and the flow rate of the hydraulic fluid from the hydraulic pumps. For example, if the motor speed 108 is 20 percent less than the maximum motor speed, the controller 72 may set the pump command output 110 to be 20 percent more than the pump command input 106 and/or the previous maximum pump command (e.g., the pump command input 106 and the previous maximum pump command may be the same). In some embodiments, the pump command output 110 may be set as the maximum pump command for the hydraulic pumps and/or stored as the maximum pump command for the hydraulic pumps (e.g., in the memory 78) so as to be accessible and used for future operations of the work vehicle (e.g., even after turning the work vehicle off and on).

As noted above, it should be appreciated that the controller may set other commands as part of the calibration protocol to achieve speed-limiting calibration. For example, the calibration protocol may provide the motor volume command output to set the minimum motor volume command for the one or more hydraulic motors based on the calibration factor to thereby provide appropriate motor speed and ground speed of the work vehicle (e.g., decrease the minimum motor volume command by the calibration factor; if the motor speed is 20 percent less than the maximum motor speed, the controller may decrease the minimum motor volume command by 20 percent). Furthermore, in some embodiments, the calibration protocol may set the maximum pump command and the minimum motor volume command in a coordinated manner (e.g., provide the command ratio output to limit the ratio between the pump command and the motor command) based on the calibration factor to thereby provide the appropriate motor speed and ground speed of the work vehicle.

As discussed above, the controller 72 may determine and/or output the calibration count 112 that indicates the total number of calibration protocols carried out by the controller 72 over time. For example, wherein the calibration protocol is triggered to increase the maximum pump command to address the underspeed condition, the controller 72 may increase the calibration count 112 by one calibration protocol. The controller 72 may provide the calibration count 112 via the display within the cab of the work vehicle for visualization by the operator. In some embodiments, the controller 72 may provide the alert (e.g., visual or audible alert) in response to the calibration count 112 exceeding the count threshold (e.g., an absolute threshold; within a time period that periodically resets). For example, if the calibration count 112 exceeds three calibration protocols within one month, the controller 72 may provide the text message on the display that recommends maintenance procedures for the work vehicle. The controller 72 may maintain one calibration count 112 that includes calibration protocols triggered by both overspeed conditions and underspeed conditions. Additionally or alternatively, the controller 72 may maintain separate calibration counts 112 for calibration protocols triggered by overspeed conditions and underspeed conditions, respectively.

While the calibration protocol is described as being carried out by calculating the calibration factor and then making a change to the maximum pump command based on the calibration factor (e.g., multiplying by the calibration factor), it should be appreciated that the calibration protocol may be carried out in other ways. For example, the controller 72 may carry out the calibration protocol with a feedback loop by adjusting the pump command, the motor command, or both until the motor speed 108 matches (e.g., matches or substantially matches, such as less than 2, 5, or 10 percent below) the maximum motor speed (e.g., for a threshold time period, such as 5, 10, 15, or 30 seconds). Then, the controller 72 may set the pump command output 110 (and/or the motor command output), and the maximum pump command (and/or the minimum motor volume command), to be the pump command (and/or the motor command) at which the motor speed 108 matches the maximum motor speed. In such cases, the calibration protocol may time out if the motor speed 108 does not match the maximum motor speed for the threshold time period and/or reach this within a time out period (e.g., 15, 30, 60 seconds or more).

Regardless of the details of the calibration protocol, the controller 72 automatically triggers the calibration protocol to recalibrate (e.g., reset) the maximum pump command, the minimum motor volume command, or both in order to provide a desirable motor speed (e.g., to match the maximum motor speed). In this way, the controller 72 operates the hydraulic system such that the motor speed does not exceed the maximum motor speed (e.g., blocks the overspeed condition), while also accounting for leakage or other changes that may occur to the hydraulic pumps over time to enable the operator to drive the work vehicle at the maximum motor speed (e.g., blocks the underspeed condition). It should be appreciated that the maximum pump command, the minimum motor volume command, or both may only be applied to limit the pump command, the motor command, or both when the work vehicle is in the highest gear, as the work vehicle may not be able to achieve the overspeed condition in the other gears (e.g., lower than the highest gear). The techniques disclosed herein may be applied to any of a variety of other types of systems, such as electric systems, that may benefit from speed-limiting calibration control.

Figure 4:
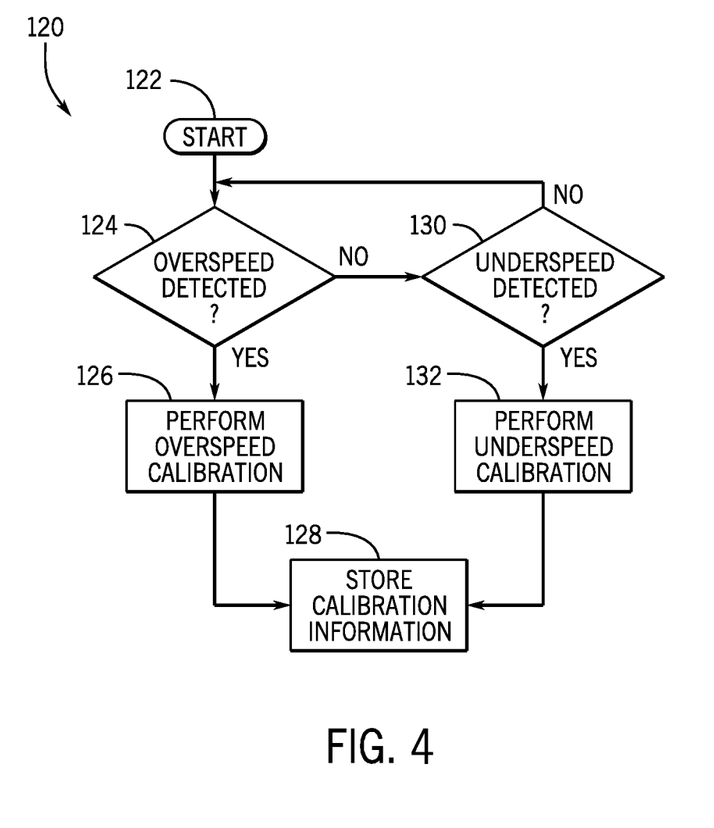
FIG. 4 is a flow diagram of a method of operating the controller of FIG. 3 to provide the speed-limiting calibration control for the hydraulic system, in accordance with an embodiment of the present disclosure.

FIG. 4 is a flow diagram of a method 120 of operating the controller 72 of FIG. 3 to provide the speed-limiting calibration control. The method 120 includes various steps represented by blocks. It should be noted that some or all of the steps of the method 120 may be performed as an automated procedure by the controller 72 of FIG. 3. Although the flow chart illustrates the steps in a certain sequence, it should be understood that the steps may be performed in any suitable order and certain steps may be carried out simultaneously, where appropriate. Further, certain steps or portions of the method 120 may be omitted and other steps may be added.

In step 122, the method 120 may begin with the controller monitoring the inputs. In step 124, the controller may analyze the inputs to determine whether the overspeed condition exists. If the overspeed condition exists, the controller may then perform the calibration protocol to address the overspeed condition (e.g., perform overspeed calibration), in step 126. The calibration protocol may include generating the calibration factor and using the calibration factor to correct the overspeed condition. The calibration factor may then be stored, in step 128. The method 120 may then return to step 122 to continue monitoring the inputs.

If the overspeed condition does not exist, the controller may then analyze the inputs to determine whether the underspeed condition exists, in step 130. If the underspeed condition exists, the controller may then perform the calibration protocol to address the underspeed condition (e.g., perform underspeed calibration), in step 132. The calibration protocol may include generating the calibration factor and using the calibration factor to correct the underspeed condition. The calibration factor may then be stored, in step 128. The method 120 may then return to step 122 to continue monitoring the inputs. As shown, if neither the overspeed condition nor the underspeed condition exist, the method 120 may return to step 122 to continue monitoring the inputs.

Advantageously, the calibration protocol enables the work vehicle to have a customized maximum pump command, minimum motor volume command, or both that may be updated over time based on the inputs 100 for the work vehicle. The disclosed embodiments provide advantages over other techniques, such as other techniques that may establish a fixed low limit on the maximum pump command at manufacturing that applies across all work vehicles having the same model of the hydraulic system, for example. In such other techniques, the maximum pump command may be set low enough to ensure that none of the work vehicles experience an overspeed condition, and as a result, most of the work vehicles will be driven with an underspeed condition and fail to utilize the maximum motor speed for the hydraulic motors. Furthermore, a continuous direct control of the pump command based on a continuous monitoring of the motor speed via a feedback loop may result in unsatisfactory instability in the hydraulic system during work operations.

Technical effects of the disclosure include a hydraulic control system that provides a speed-limiting calibration protocol for a work vehicle. The calibration protocol may include an overspeed calibration protocol that is triggered based on certain inputs indicating occurrence of an overspeed condition. Additionally or alternatively, the calibration protocol may include an underspeed calibration protocol that is triggered based on certain inputs indicating occurrence of an underspeed condition. The calibration protocol may efficiently calibrate a hydraulic system, such as by generating a calibration factor and then using the calibration factor to set a maximum pump command for hydraulic pumps of the hydraulic system, a minimum motor volume command for hydraulic motors of the hydraulic system, or both. The maximum pump command, the minimum motor volume command, or both may be stored and utilized for future operations of the work vehicle. In this way, the hydraulic control system may block overspeed conditions, underspeed conditions, or both.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]" or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hydraulic system for a work vehicle, the hydraulic system comprising:
 a hydraulic motor configured to generate rotational power for one or more wheels on the work vehicle;
 a hydraulic pump coupled to the hydraulic motor, wherein the hydraulic pump is configured to pump hydraulic fluid to the hydraulic motor; and
 a hydraulic control system comprising a processor that is configured to:
  receive one or more inputs indicative of a speed of the hydraulic motor;
  trigger a calibration protocol in response to determining that the one or more inputs indicate occurrence of an overspeed condition or an underspeed condition, wherein the calibration protocol comprises comparing the speed of the hydraulic motor to a maximum speed for the hydraulic motor to generate a calibration factor, and the calibration factor comprises a ratio of the speed to the maximum speed; and
  set a maximum pump command for the hydraulic pump, a minimum motor volume command for the hydraulic motor, or both based on the calibration factor.

2. The hydraulic system of claim 1, wherein the processor is configured to store the maximum pump command, the minimum motor volume command, or both in a memory device.

3. The hydraulic system of claim 2, wherein the processor is configured to access the maximum pump command, the minimum motor volume command, or both from the memory device and to use the maximum pump command for the hydraulic pump, the minimum motor volume command for the hydraulic motor, or both during one or more future work operations.

4. The hydraulic system of claim 1, wherein the processor is configured to set the maximum pump command or the minimum motor volume command by multiplying a pump command input or a motor command input, respectively, used during the overspeed condition or the underspeed condition by the calibration factor.

5. The hydraulic system of claim 1, wherein, in response to determining that the one or more inputs indicate the occurrence of the overspeed condition, the processor is configured to decrease a pump command input used during the overspeed condition to the maximum pump command, to increase a motor command input used during the overspeed condition to the minimum motor volume command, or both to thereby block the overspeed condition.

6. The hydraulic system of claim 1, wherein the one or more inputs comprise an input device position that is indicative of a driving direction.

7. The hydraulic system of claim 1, wherein the one or more inputs comprise a speed range.

8. The hydraulic system of claim 1, wherein the one or more inputs comprise a load on an engine.

9. The hydraulic system of claim 1, wherein, in response to determining that the one or more inputs indicate the occurrence of the underspeed condition, the processor is configured to increase a pump command input used during the underspeed condition to the maximum pump command, to decrease a motor command input used during the underspeed condition to the minimum motor volume command, or both to thereby block the underspeed condition.

10. The hydraulic system of claim 1, wherein the processor is configured to determine that the one or more inputs indicate the occurrence of the underspeed condition in response to the speed being below the maximum speed while an input device position indicates that a driving direction is straight, a speed range is a highest speed range of the hydraulic system, and a load on an engine is below a load threshold.

11. The hydraulic system of claim 1, wherein the processor is configured to count a number of calibration protocols over time.

12. The hydraulic system of claim 11, wherein the processor is configured to output a notification in response to the number of calibration protocols exceeding a threshold number.

13. A hydraulic control system for a work vehicle, the hydraulic control system comprising a processor that is configured to:
receive a first input indicative of a speed of a hydraulic motor;
receive a second input indicative of a motor parameter for the hydraulic motor;
receive a third input indicative of a pump parameter for a hydraulic pump that is configured to pump a hydraulic fluid to the hydraulic motor;
trigger a calibration protocol in response to determining occurrence of an overspeed condition in which the speed exceeds a maximum speed of the hydraulic motor or an underspeed condition in which the speed is below the maximum speed of the hydraulic motor;
determine a calibration factor based on a ratio between the speed and the maximum speed of the hydraulic motor as part of the calibration protocol; and
set a maximum pump parameter for the hydraulic pump based on the pump parameter for the hydraulic pump and the calibration factor, a minimum motor volume parameter for the hydraulic motor based on the motor parameter and the calibration factor, or both.

14. The hydraulic control system of claim 13, wherein the processor is configured to:
receive one or more additional inputs comprising an input device position, a speed range, a load on an engine, or any combination thereof; and
determine the occurrence of the overspeed condition or the underspeed condition using the one or more additional inputs.

15. The hydraulic control system of claim 14, wherein the processor is configured to determine the occurrence of the underspeed condition in response to the speed being below the maximum speed of the hydraulic motor while the input device position indicates that a driving direction is straight, the speed range is a highest speed range, and the load on the engine is below a load threshold.

16. The hydraulic control system of claim 13, wherein the processor is configured to store the maximum pump parameter, the minimum motor volume parameter, or both in a memory device.

17. The hydraulic control system of claim 13, wherein the processor is configured to count a number of calibration protocols over time.

18. A method of operating a hydraulic system for a work vehicle, the method comprising:
providing, using one or more processors, a pump command to a hydraulic pump to cause the hydraulic pump to pump hydraulic fluid to a hydraulic motor;
receiving, at the one or more processors, one or more inputs indicative of a speed of the hydraulic motor, wherein the one or more inputs comprise an input device position, a speed range, a load on an engine, or any combination thereof;
triggering, using the one or more processors, a calibration protocol in response to determining that the one or more inputs indicate occurrence of an overspeed condition or an underspeed condition;
generating, using the one or more processors, a calibration factor based on the speed of the hydraulic motor and a maximum speed for the hydraulic motor; and
setting, using the one or more processors, a maximum pump command for a hydraulic pump, a minimum motor volume command for the hydraulic motor, or a command ratio between the maximum pump command and the minimum motor volume command based on the calibration factor.

19. A hydraulic system for a work vehicle, the hydraulic system comprising:
a hydraulic motor configured to generate rotational power for one or more wheels on the work vehicle;
a hydraulic pump coupled to the hydraulic motor, wherein the hydraulic pump is configured to pump hydraulic fluid to the hydraulic motor; and
a hydraulic control system comprising a processor that is configured to:
receive one or more inputs indicative of a speed of the hydraulic motor;
trigger a calibration protocol in response to determining that the one or more inputs indicate occurrence of an overspeed condition or an underspeed condition, wherein the calibration protocol comprises comparing the speed of the hydraulic motor to a maximum speed for the hydraulic motor to generate a calibration factor; and
set a maximum pump command for the hydraulic pump, a minimum motor volume command for the hydraulic motor, or both by multiplying a pump command input or a motor command input, respectively, used during the overspeed condition or the underspeed condition by the calibration factor.

20. A hydraulic system for a work vehicle, the hydraulic system comprising:
a hydraulic motor configured to generate rotational power for one or more wheels on the work vehicle;
a hydraulic pump coupled to the hydraulic motor, wherein the hydraulic pump is configured to pump hydraulic fluid to the hydraulic motor; and
a hydraulic control system comprising a processor that is configured to:
receive one or more inputs indicative of a speed of the hydraulic motor;
trigger a calibration protocol in response to determining that the one or more inputs indicate occurrence of an overspeed condition or an underspeed condition, wherein the calibration protocol comprises comparing the speed of the hydraulic motor to a maximum speed for the hydraulic motor to generate a calibration factor;
set a maximum pump command for the hydraulic pump, a minimum motor volume command for the hydraulic motor, or both based on the calibration factor; and
count a number of calibration protocols over time.

21. The hydraulic system of claim 20, wherein the processor is configured to output a notification in response to the number of calibration protocols exceeding a threshold number.

* * * * *